United States Patent [19]

Hoch et al.

[11] Patent Number: 5,619,646
[45] Date of Patent: Apr. 8, 1997

[54] METHOD AND SYSTEM FOR DYNAMICALLY APPENDING A DATA BLOCK TO A VARIABLE LENGTH TRANSMIT LIST WHILE TRANSMITTING ANOTHER DATA BLOCK OVER A SERIAL BUS

[75] Inventors: Gary B. Hoch, Coral Springs; Timothy V. Lee, Boca Raton; Rex E. McCrary, Boca Raton; Stephanie P. Payne, Boca Raton; Daniel Petkevich, Ft. Lauderdale; Hai V. Pham, Margate, all of Fla.

[73] Assignee: International Business Machines Corporation, Armonk, N.Y.

[21] Appl. No.: 313,638

[22] Filed: Sep. 27, 1994

[51] Int. Cl.⁶ .................................................. G06F 13/00
[52] U.S. Cl. ...................... 395/200.01; 395/840
[58] Field of Search ............................. 395/200.01, 500, 395/250, 840; 370/83; 364/260

[56] References Cited

U.S. PATENT DOCUMENTS

| | | | |
|---|---|---|---|
| 4,435,762 | 3/1984 | Milligan et al. | 364/200 |
| 4,621,320 | 11/1986 | Holste et al. | 364/200 |
| 4,935,925 | 6/1990 | Williams et al. | 370/83 |
| 4,949,301 | 8/1990 | Joshi et al. | 364/900 |
| 5,133,062 | 7/1992 | Joshi et al. | 395/500 |
| 5,182,800 | 1/1993 | Farrell et al. | 395/425 |
| 5,251,303 | 10/1993 | Fogg, Jr. et al. | 395/275 |
| 5,317,692 | 5/1994 | Ashton et al. | 395/200 |
| 5,432,907 | 7/1995 | Picazo, Jr. et al. | 395/200 |
| 5,448,702 | 9/1995 | Garcia, Jr. et al. | 395/325 |

OTHER PUBLICATIONS

"IEEE Standard for a High Performance Serial Bus", The Institute Of Electrical And Electronic Engineers, Inc., Draft 7.1v1, IEEEP1394, Aug. 5, 1994.

Marazas, et al., "Information Technology—SCSI-3 Serial Bus Protocol (SBP)", X3T10 992D, Rev. 18, Working Draft, Aug. 11, 1994.

*TSB12C01, P1394 High-Speed Serial-Bus Link-Layer Controller Data Manual*, Linear Products, 1994, Texas Instruments Incorporated.

*TSB11C01, P1394 Triple-Cable Transceiver/Arbiter,* SLLS167–Mar. 1994, Texas Instruments Incorporated.

Teener, Michael, A Bus on a Diet—The Serial Bus Alternative, An Introduction to the P1394 High Performance Serial Bus, IEEE, pp. 316–321 (1992).

*Primary Examiner*—Thomas C. Lee
*Assistant Examiner*—Duo Chen
*Attorney, Agent, or Firm*—George E. Grosser; John G. Graham

[57] ABSTRACT

A computer system allows for a hardware structure to participate in the transmission of P1394 packets, which are comprised of command or data blocks from linked list structures in a system memory, is disclosed. The system is able to provide dynamic appending of these command or data blocks to the link list while they are being operated upon. This provides an efficient transaction layer operation, which minimizes signalling between the link list operator or control code, and other hardware features.

6 Claims, 7 Drawing Sheets

METHOD AND SYSTEM FOR DYNAMICALLY APPENDING A DATA BLOCK TO A VARIABLE LENGTH TRANSMIT LIST WHILE TRANSMITTING ANOTHER DATA BLOCK OVER A SERIAL BUS

CROSS-REFERENCE TO RELATED APPLICATION

The present application is related to U.S. patent application Ser. No. 08/313,680, still pending, entitled "Method And System For Matching Packet Size For Efficient Transmission Over a Serial Bus," U.S. patent application Ser. No. 08/312,854, still pending entitled "Acyclic Cable Bus Having Redundant Path Access", U.S. patent application Ser. No. 08/313,679, still pending entitled "Method For Generating Topology Map For A Serial Bus", U.S. patent application Ser. No. 08/313,483, now U.S. Pat. No. 5,504,757 entitled "Method For Selecting Transmission Speeds For Transmitting Data Packets Over A Serial Bus", U.S. patent application Ser. No. 08/312,746, still pending entitled "Method And System For Determining Maximum Cable Segments On A Serial Bus Having Multiple Transmission Rates", and U.S. patent application Ser. No. 08/313,490, still pending entitled "Method And System For Automatically Generating A Read Response Packet With Speed Matching Over A Serial Bus", and all filed of even date herewith by the inventors hereof and assigned to the assignee herein, and incorporated by reference herein.

BACKGROUND OF THE INVENTION

1. Technical Field

The present invention relates, generally, to data transmission over a high performance serial bus, and more particularly, to being able to append data blocks to data structures to transmit data across a serial bus network. More specifically, the invention relates to an apparatus and method capable of appending data to control data structures or data blocks prior to transmission over a serial bus network.

2. Description of the Related Art

The IEEE has proposed a new high performance serial bus standard under the P1394 standard. P1394 is a serial input/output bus whose physical media is a cable that consists of three shielded twisted pairs. P1394 allows a tree topology interconnect of nodes, systems or devices, for reducing the time typically required for turnaround among the nodes. P1394 can operate at multiple transmission rates, such as approximately 100 megabits per second, 200 megabits per second, and 400 megabits per second, and has universal interconnect capabilities for desktop systems, peripheral devices such as printers, hard disks, digital camera.

Under P1394, data transmission packets require control data structures or data blocks for identifying source and destination, length, and command information. Once the data structure is received by a destination node, the information within the data structure is used to generate a new data structure or data block for return transmission to the original source of the data structure. Once the data structure has been reformatted, a request in memory is made to locate the data sought by the initial read request within the original data structure. Unfortunately, waiting until after the data structure has been reformatted increases the amount of turnaround time needed to retrieve the data requested by the original source node.

Accordingly, what is needed is a way to dynamically link data to the data structure being reformatted so that, upon completion of the reformatting of the original data structure, the data requested is already linked for transmission, thus reducing turnaround time at the destination node before retransmission to the original source node. Also, what is needed is a way of linking the next data block for processing and transmission in order to increase the amount of data processed and transmitted.

SUMMARY OF THE INVENTION

It is therefore one object of the present invention to provide data transmission over a high performance serial bus.

It is another object of the present invention to be able to append data blocks to data structures for transmitting data across a serial bus.

It is yet another object of the present invention to provide an apparatus and method capable of appending data to control data structures or data blocks prior to transmission over a serial bus.

The foregoing objects are achieved as is now described. According to the present invention, a computer system allows for a hardware structure to participate in the transmission of P1394 packets, which are comprised of command or data blocks from linked list structures in a system memory, is disclosed. The system is able to provide dynamic appending of these command or data blocks to the link list while they are being operated upon. This provides an efficient transaction layer operation, which minimizes signalling between the link list operator or control code, and other hardware features. This also has the advantage of eliminating excessive system bus I/O commands to other hardware elements for the transmission of the P1394 packets.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
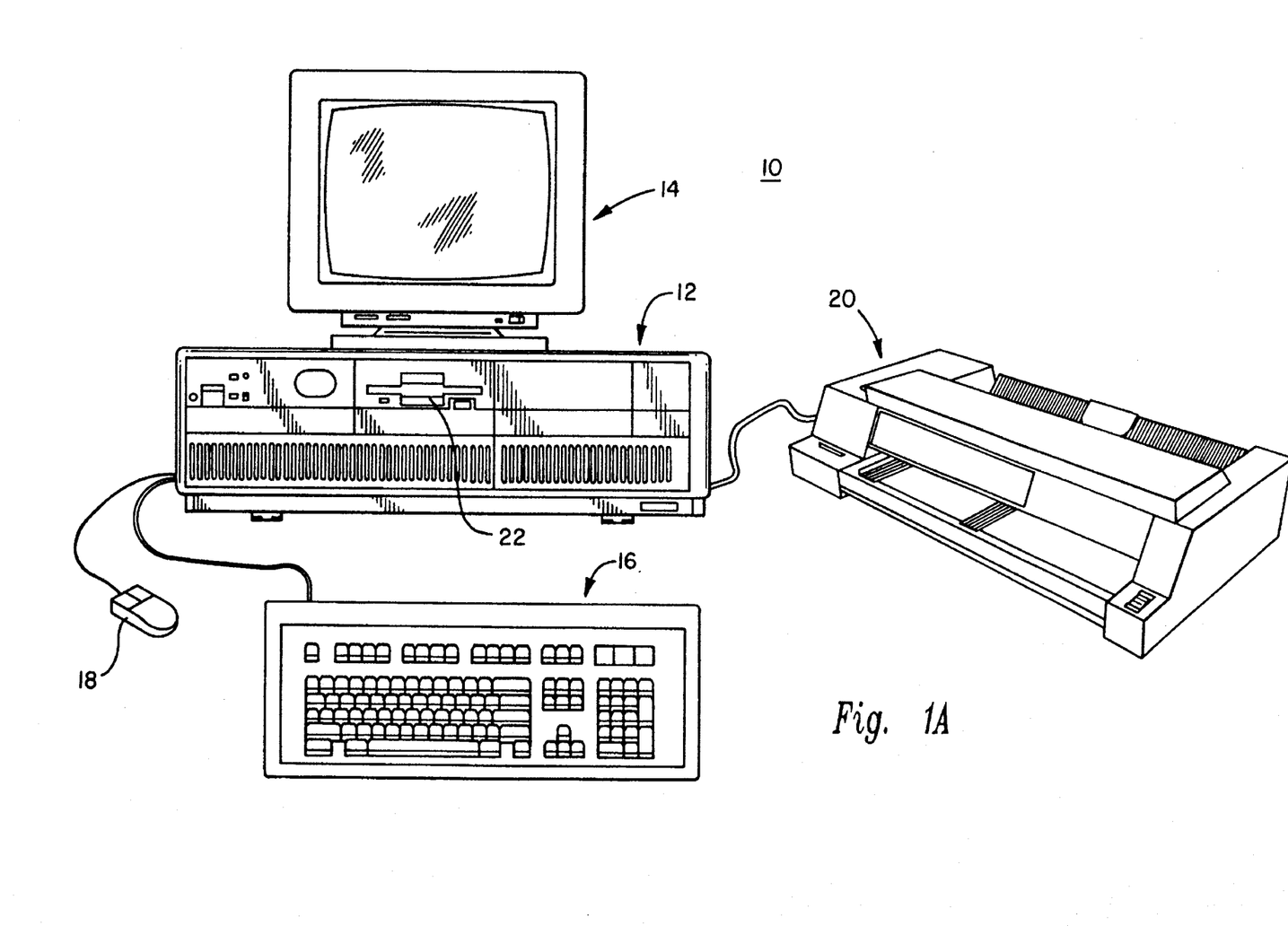
FIG. 1A depicts a data processing system in the form of a personal computer in which the present invention can be employed is depicted.

Referring now to the figures, and in particular to FIG. 1A, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 1B:
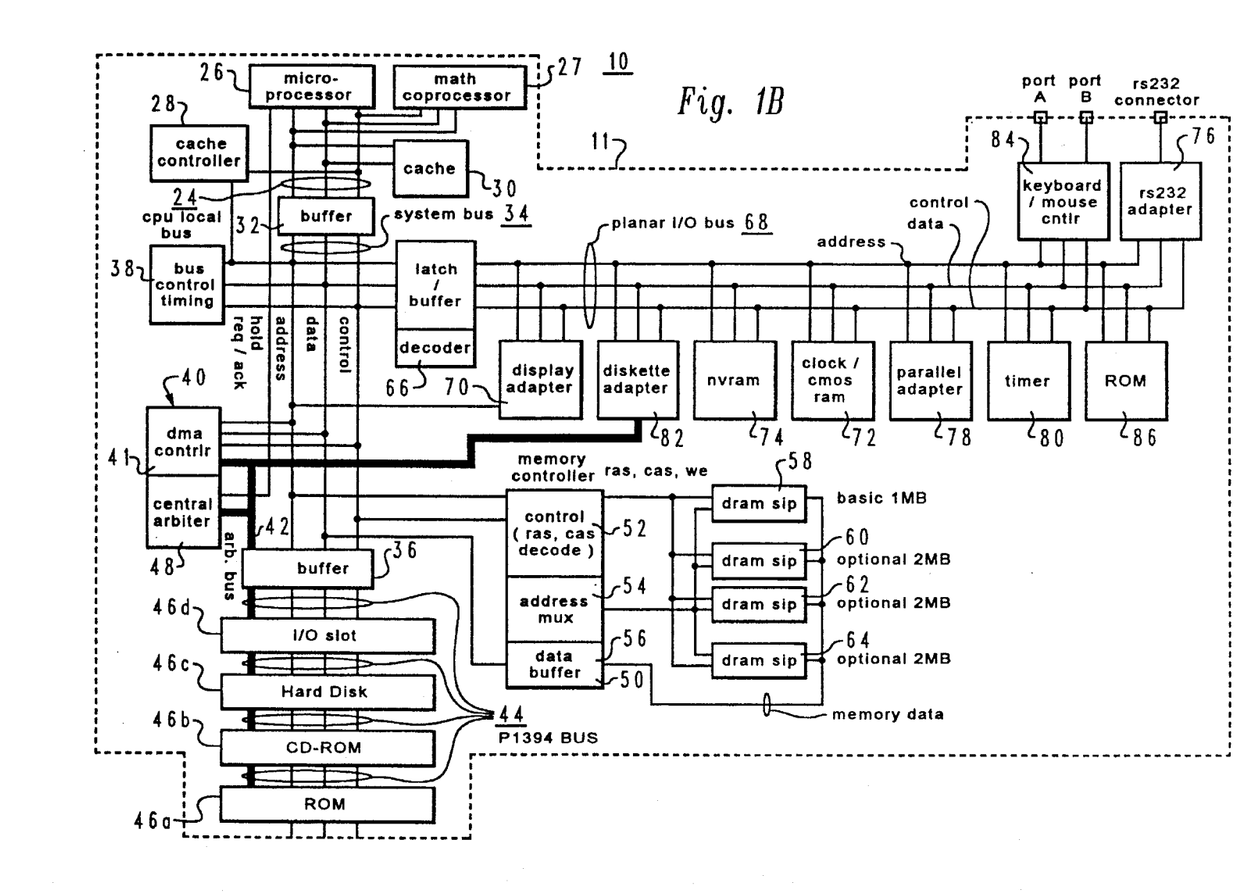
FIG. 1B is a block diagram of a personal computer system illustrating the various components of personal computer system in accordance with the present invention.

Prior to relating the above structure to the present invention, a summary of the operation in general of personal computer system 10 may merit review. Referring to FIG. 1B, there is shown a block diagram of personal computer system 10 illustrating the various components of personal computer system 10 in accordance with the present invention. FIG. 1B further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 1B, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 1B, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus such as the P1394 Serial Bus 44. Connected to bus 44 are a plurality of I/O slots or nodes 46a–46d for receiving P1394 adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the perdonal computer system 10 is shown with a basic 1 megabyte RAM module, it is understood that additional memory can be interconnected as represented in FIG. 1B by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Each P1394 slot or node in the computer system of FIG. 1A is capable of dynamically appending the control data structures (CDS) or data blocks into an active linked list for continuous operation and without any race conditions. The CDSes, which contain the system addresses, length, and command information, are used to inform the target to perform data transfer, such as read or write, as described in ANSI SCSI 3 Serial Bus Protocol, herein incorporated by reference. After the target receives the CDS packet, the target can optionally fetch more CDSes for tagged command queuing function to optimize its performance before the first CDS is executed. To fetch more CDSes, the target uses the block_read_request packet with the next CDS pointer, which was contained in the previous CDS.

Figure 2:
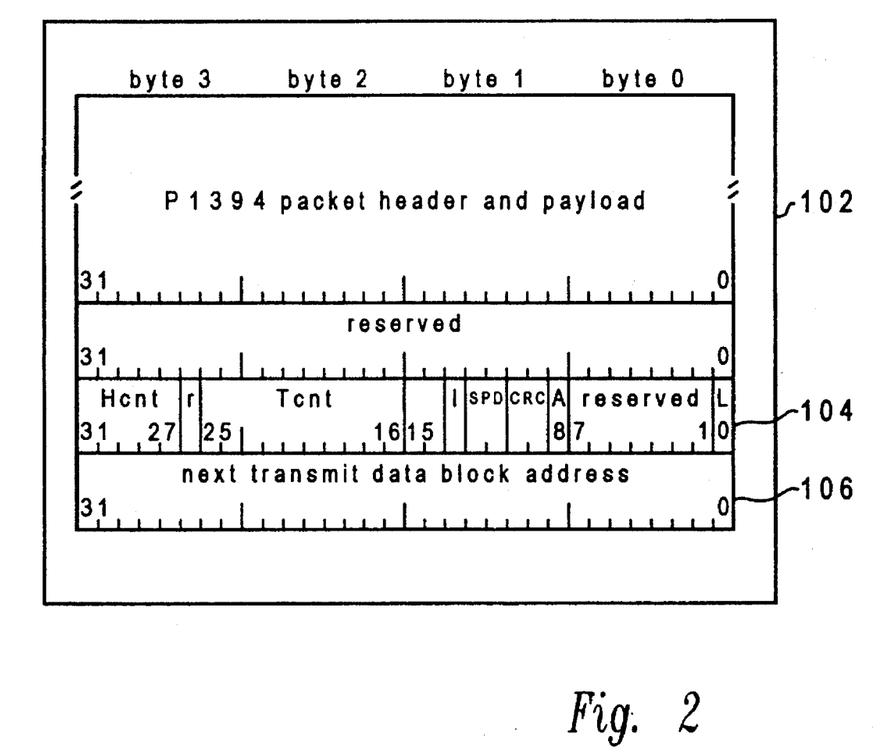
FIG. 2 is a block diagram of a data packet according to the present invention.

To understand the operation of dynamic linked list, a single transmit data block 102, which resides in system memory, is illustrated in FIG. 2. The last two entries of the transmit data block are the control word 104 and next address 106, respectively of the next transmit data block. The fields in the control word are defined as follows. The L block signifies the last bit, which uses a "1" to indicate the current transmit data block is the last one of the linked list. The A block is the acknowledge required bit, which uses a "1" to indicate the one-byte P1394 acknowledge code required from the target after the packet is transmitted. When sending a broadcast packet, this bit must be set to "0". The CRC block is a two-bit code indicating the number of cyclic redundancy checks (CRC) required for the next transmit data block. A binary or B'00' signifies no CRC is required. A B'01' signifies only one CRC is required. When dynamic linking is required, the system calculates the CRC and appends it to the end of the data when transmitting the next transmit data block. A B'10' indicates two CRCs are required. The first CRC is appended to the end of the bytes indicated by the Hcnt field while the second one is appended to the end of the data, which is indicated by the Tcnt field less 12 bytes. A B'11' is reserved and is currently treated the same as a B'10' code.

A SPD block represents the speed at which the next data block is to be transmitted. The upper bit is reserved for 400 megabits per second and up expansion. The lower bit is defined as B'0' signifies a transmit rate of 100 megabits per second while a B'1' indicates a transmit rate of 200 megabits per second. The "I" block represents an interrupt when pending signal. When set to "1" the system interrupts the host if an acknowledgement code of pending is received. Since the target will be sending a write response packet later, the system needs to know to which target to send the write response packet. When set to B'0', no interrupt will be reported if pending is received.

The "Tcnt" field represents the total byte count of the next data block including the last three reserved, control, and next address words. The "Hcnt" field represents the header byte count. The system appends the first CRC at the end of byte indicated by this Hcnt field when transmitting the data. This field is ignored if the CRC field is not B'10'. Also, the two least significant bits of this counter are ignored to make the header field conform to a 4-byte alignment. The last two fields, "Rsv" and "R" are both reserved and set to zero at this time.

The Control and Next Address words of the next transmit data block are designed to reside in the preceding data block so that the system can set up the direct memory access (DMA) for fetching the next transmit data block. The control and next address words of the first transmit data block of the transmit data link list reside in the system.

Figure 3:
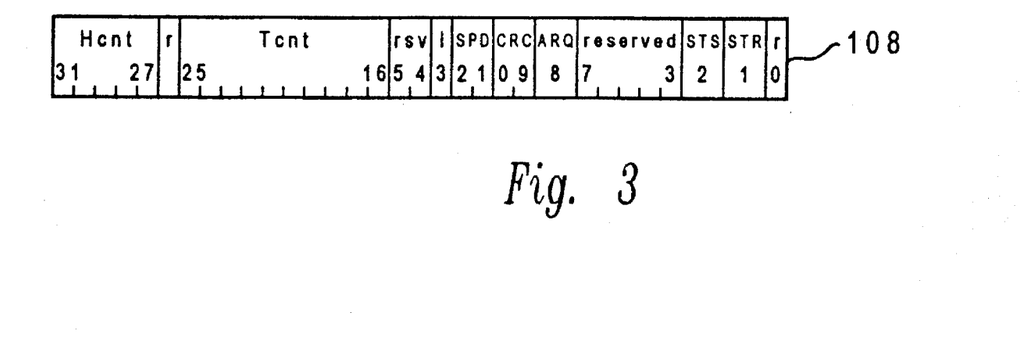
FIG. 3 is a block diagram of a transmit packet register according to the present invention.
Figure 4:
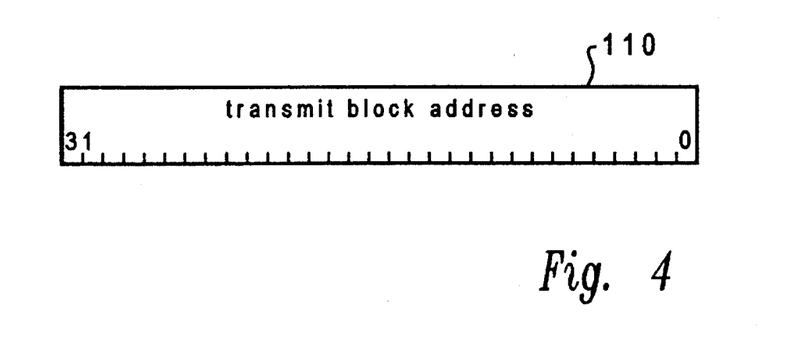
FIG. 4 is a block diagram of a transmit address register according to the present invention.

Two additional registers are illustrated in FIGS. 3 and 4. In FIG. 3, a Transmit Packet Control Register 108 is shown that is used to control how the data in the transmit buffer, following the fetching from the transmit packet linked list, is to be formatted when sending the data out on the P1394 bus. The Transmit Packet Control Register 108 resides within a Link unit within the system and is used as the control register for the first data block of the linked list in system memory. This register is replaced by the respective control word of the data block shown in FIG. 2, except for the STR and STS bits, which are start and status, respectively. The STR bit is set to '1' by the system so that the data in one of the transmit buffers is formatted and transmitted according to how the other bits are set in this control register. The system will reset the bit to '0' to reflect the L bit of the chain, or last block. When the system writes a '0' following a '1' bit, the system suspends the transmit data linked list operation at the next convenient point. This allows an urgent data block to be sent out if the transmit packet linked list was long. The STS bit is a read only bit and when set to '1' the system is currently sending the data out from the transmit buffer. When this bit is set to '0', this signifies that the system is done transmitting. The ARQ block represents the acknowledge required bit. When set to '1', the system waits for the acknowledgment code from the target after transmitting the packet. When this byte is set to '0' the system does not wait for the response acknowledgment code. This bit must be set to '0' when transmitting a broadcast packet that does not require a return acknowledgment. The CRC block and the SPD block are the same as those in the transmit data block of FIG. 2. Further, the "1" block, the Tcnt block, the R block, the Hcnt block, and the Rsv block are the same as those used in the transmit data block of FIG. 2.

FIG. 4 represents the Transmit Packet Address Register 110, which is used to hold the address of the first transmit block of the transmit packet linked list in the system memory. This register is also updated to the next transmit data address after the current data block is fetched into the system.

Figure 5:
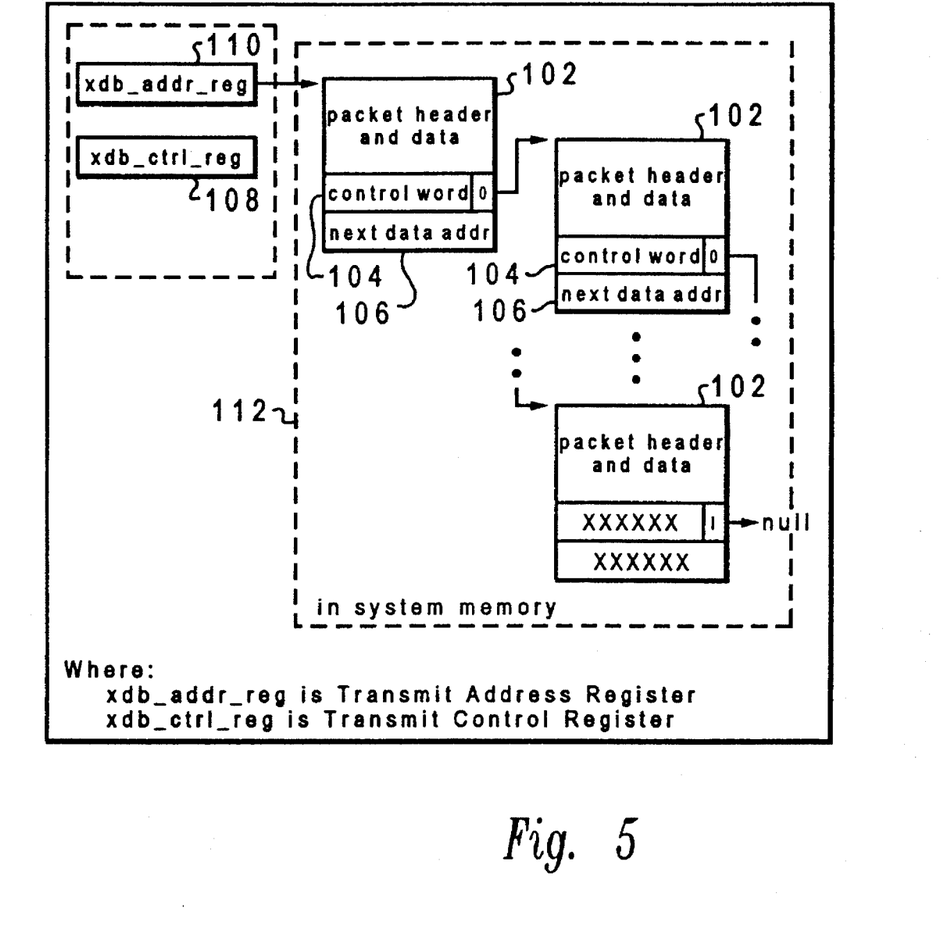
FIG. 5 is a block diagram of a data flow dynamic packet linking according to the present invention.
Figure 6:
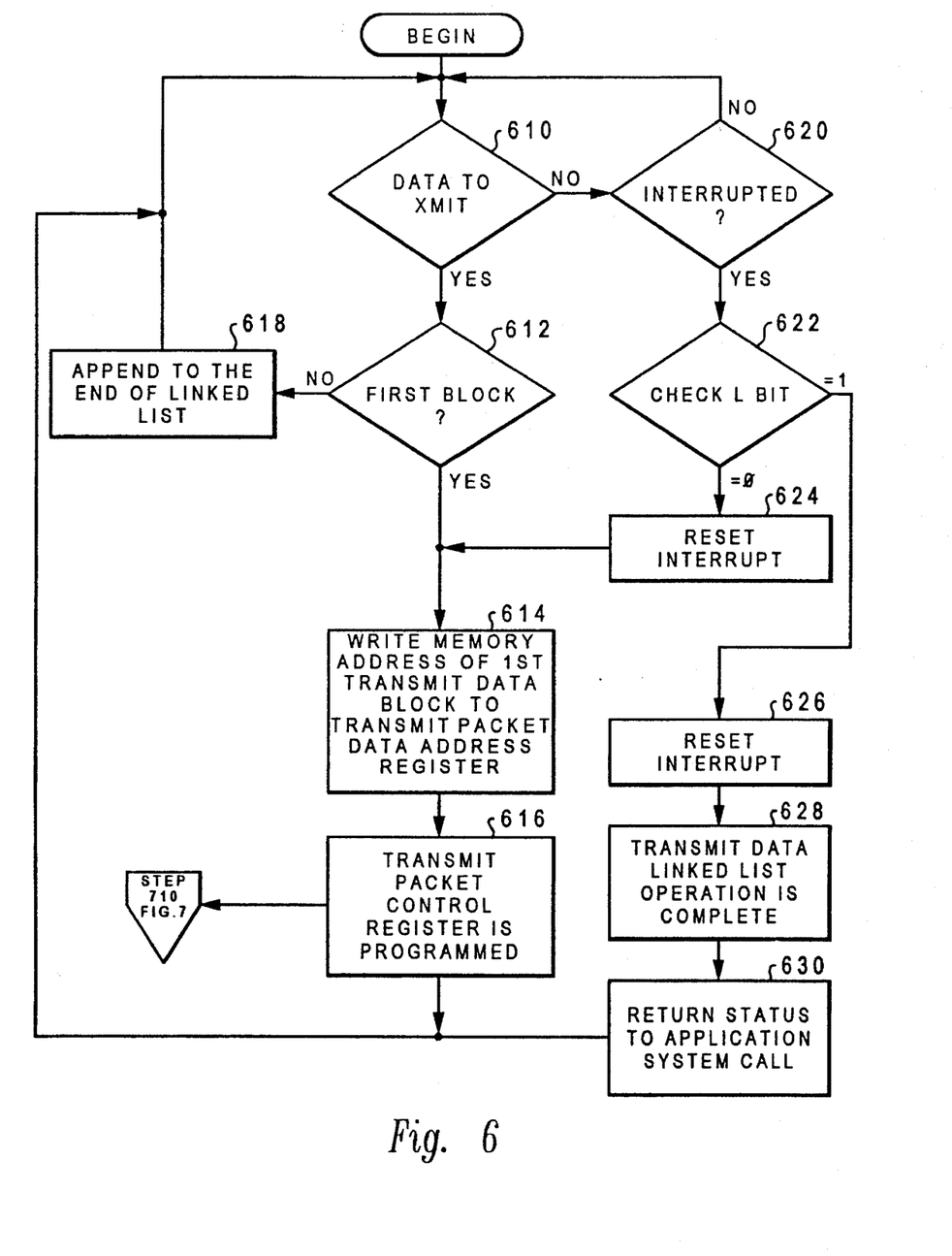
FIG. 6 is a flowchart depicting the operation of the data flow according to the FIG. 5; illustrating the dynamic appending of a data block to a variable length transmit list
Figure 7:
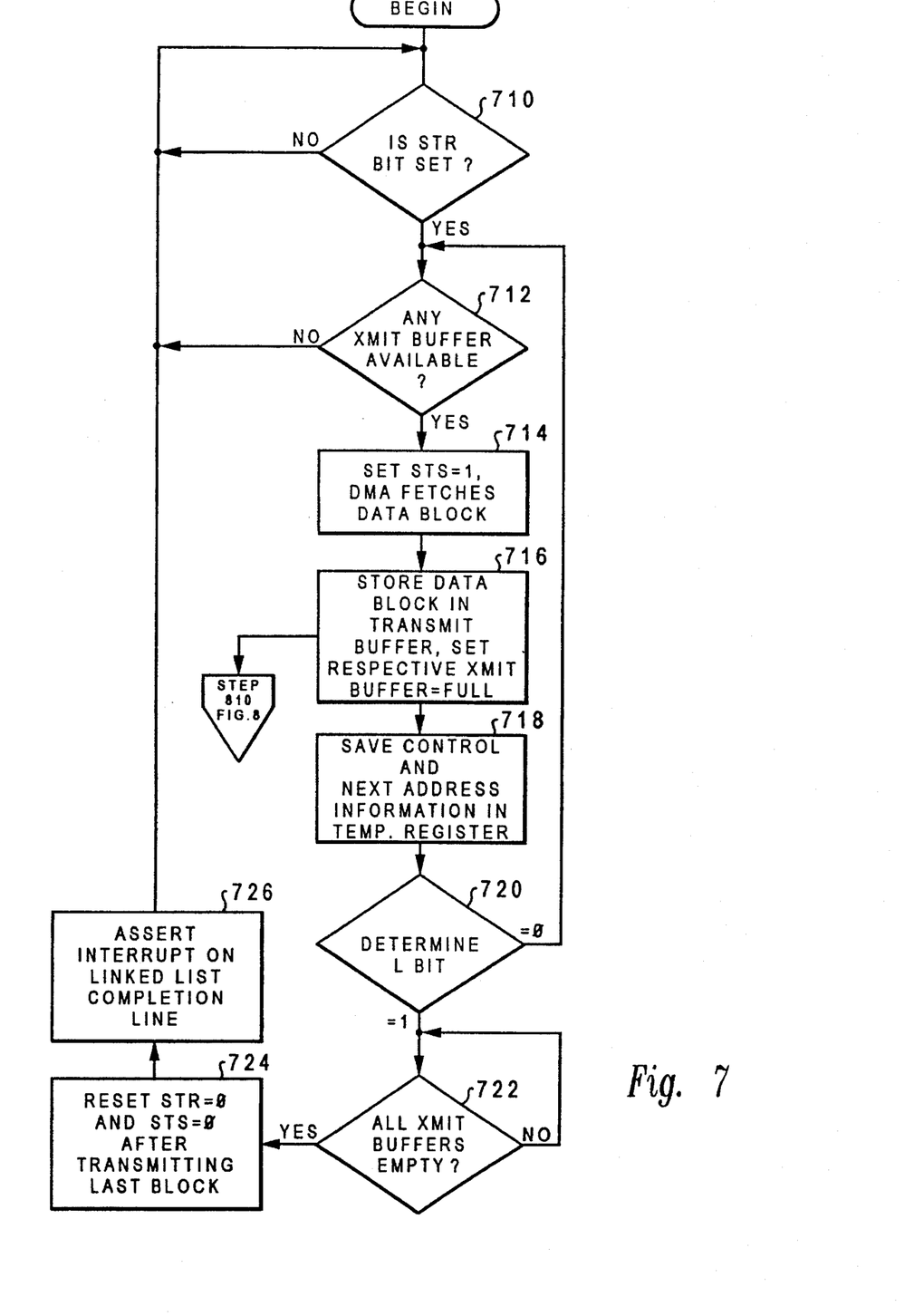
FIG. 7 is a flowchart depicting the data flow of the operation of FIG. 5.
Figure 8:
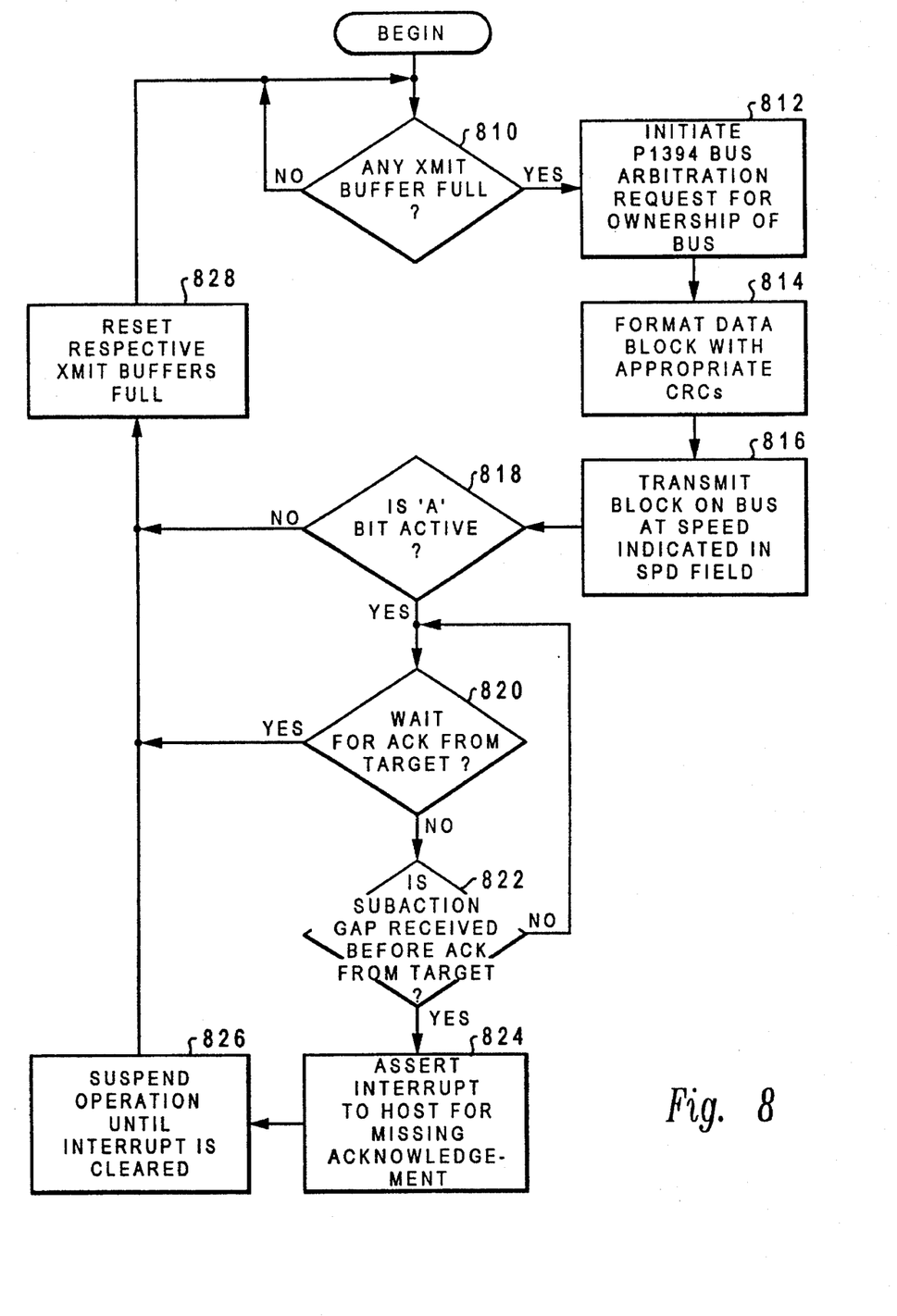
FIG. 8 is a flowchart further depicting the data flow of the invention of FIG. 5.

FIG. 5 is a block diagram depicting the flow of operation of the dynamic linking, which is also depicted in the flowchart of FIGS. 6–8. In step 610, the system determines whether one or more data blocks 102 are to be transmitted and if so, proceeds to step 612 where the system determines whether data block 102 is the first block to be transmitted. If so, the system, in step 614, writes the memory address of a first transmit data block to the transmit packet data address register 110. Next, in step 616, the system programs the transmit packet control register 108 before appending the end of link list in step 618. If, in step 612, the first block is not selected, the system appends data block 102 to the end of the link list in step 618.

If no data is to be transmitted, the system determines whether a system interrupt has occurred in step 620. If not, the system returns to step 610; otherwise, the system proceeds to step 622 where the system checks the L bit. If the L bit is equal to '0', the system, in step 624, resets the interrupt and proceeds to step 614. If the L bit is equal to '1', the system, in step 626, resets the interrupt and determines that the data link list operation is complete in step 628. Next, in step 630, the system returns the status to the application system call, before returning to step 618.

Meanwhile, the system determines whether the STR bit (Step 616) is set and proceeds to step 712 accordingly. In step 712, the system determines whether any transmit buffers are available. If yes, the system, in step 714 sets the STS bit to '1', while the DMA fetches the appropriate data block. Next, in step 716, the system stores the data block in a transmit buffer, and then sets the respective transmit buffer equal to full. In step 718, the system saves the control and the next address information 106 in a temporary register and then, in step 720, determines whether the L bit is equal to '1' or '0'. If the L bit is equal to '0', the system returns to step 712; otherwise, if the L bit is equal to '1', the system proceeds to determine whether all transmit buffers are empty in step 722. Once all transmit buffers are empty, the system, in step 724, resets the STR bit to '0' and the STS bit to '0' after transmitting the last data block. Then, in step 726, the system asserts the interrupt on the link list completion line before returning to step 710.

Once the transmitter buffers are full (step 716), the system, following the flowchart of FIG. 8, determines, in step 810, whether any transmit buffers are full and if so, proceeds to step 812. In step 812, the system initiates the P1394 bus arbitration request for ownership of the bus. Upon obtaining the bus communication, the system, in step 814, formats the data blocks with the appropriate CRCs. Next, in step 816, the system transmit transmits the block on the bus at the speed indicated in the SPD field. In step 818, the system then determines whether the A bit is active and if so, proceeds to step 820. In step 820, the system determines whether an acknowledgment has been received from the target. If not, the system proceeds to step 822, where the system determines whether the subaction gap was received before the acknowledgement from the target was received and if not, returns to step 820. If the subaction gap is received before the acknowledgement from the target, the system, in step 824, assets an interrupt to host for the missing acknowledgement. In step 826, the system then suspends operation until the interrupt is cleared. If the A bit is not active or after the interrupt is cleared, the system resets the respective transmitter buffers accordingly.

This system allows for a hardware structure to participate in the transmission of P1394 packets, which are comprised of command or data blocks from linked list structures in a system memory. The system is able to provide dynamic appending of these command or data blocks to the link list while they are being operated upon. This provides an efficient transaction layer operation, which minimizes signalling between the link list operator or control code, and other hardware features. This also has the advantage of eliminating excessive system bus I/O commands to other hardware elements for the transmission of the P1394 packets.

While the invention has been particularly shown and described with reference to a preferred embodiment, it will be understood by those skilled in the art that various changes in form and detail may be made therein without departing from the spirit and scope of the invention.

We claim:

1. In a computer system using a transmission path between a plurality of nodes on said computer networking system, each node being connected to at least one other node via said path, a method of linking data operation procedures comprising the steps of:

generating a variable length transmit list of transmit data to be linked, said list including an address register and a control register;

writing a memory address of a first transmit data block to said address register;

loading a data operation procedure associated with said first transmit data block;

retrieving said transmit data block from a memory storage location;

determining whether said first transmit data block includes a linked next transmit data block indicator having a next address field;

upon identifying said indicator, retrieving a next transmit data block based on a next memory address stored in said next address field while transmitting said first transmit data block according to said data operating procedure;

storing said next memory address for said next transmit data block in said address register and a next data operating procedure in said control register;

upon indication that said address and control registers are full, requesting control of said path;

upon obtaining control of said path, formatting each transmit data block for transmission according to a data operation procedure;

before completion of the foregoing two steps, dynamically appending another transmit data block to the end of said transmit list.

2. The invention according to claim 1 further comprising the step of setting a transmit speed according to a transmit speed indicator found in said data procedure operation.

3. The invention according to claim 1 wherein said step of retrieving a next transmit data block dynamically links said next address field to said transmit list for subsequent operation.

4. In a computer system using a transmission path between a plurality of nodes on said computer networking system, each node being connected to at least one other node via said path, a system for linking data operation procedures comprising:

means for generating a variable length transmit list of transmit data to be linked, said list including an address register and a control register;

means for writing a memory address of a first transmit data block to said data block;

means for loading a data operation procedure associated with said first transmit data block;

means for retrieving said, transmit data block from a memory storage location;

means for determining whether said first transmit data block includes a linked next transmit data block indicator having a next address field;

upon identifying said indicator, means for retrieving a next transmit data block based on a next memory address stored in said next address field while transmitting said first transmit data block according to said data operating procedure;

means for storing said next memory address for said next transmit data block in said address register and a next data operating procedure in said control register;

upon indication that said address and control registers are full, means for requesting control of said path;

upon obtaining control of said path, means for formatting each transmit data block for transmission according to an associated data operation procedure; and means for dynamically appending another transmit data block linked to a last transmit data block of said transmit list, before said means for requesting has relinquished control of said path.

5. The invention according to claim 4 further comprising means for setting a transmit speed according to a transmit speed indicator found in said data procedure operation.

6. The invention according to claim 4 wherein said means for retrieving a next transmit data block dynamically links said next address field to said transmit list for subsequent operation.

\* \* \* \* \*